US008760485B2

(12) United States Patent
Dunn et al.

(10) Patent No.: US 8,760,485 B2
(45) Date of Patent: *Jun. 24, 2014

(54) SYSTEM AND METHOD FOR DISPLAYING PARTICIPANTS IN A VIDEOCONFERENCE BETWEEN LOCATIONS

(75) Inventors: Kristin Andrew Dunn, Livermore, CA (US); David J. Mackie, Brookdale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1481 days.

This patent is subject to a terminal disclaimer.

(21) Appl. No.: 11/366,861

(22) Filed: Mar. 2, 2006

(65) Prior Publication Data

US 2007/0206091 A1    Sep. 6, 2007

(51) Int. Cl.
H04N 7/14        (2006.01)

(52) U.S. Cl.
USPC .................... 348/14.01; 709/204

(58) Field of Classification Search
USPC .......................... 348/14.01–14.09
See application file for complete search history.

(56) References Cited

U.S. PATENT DOCUMENTS

| | | | | |
|---|---|---|---|---|
| 4,400,724 A | 8/1983 | Fields | | 358/85 |
| 5,737,011 A | 4/1998 | Lukacs | | 348/15 |
| 6,049,694 A | 4/2000 | Kassatly | | |
| 6,172,703 B1 | 1/2001 | Lee | | 348/15 |
| 6,266,082 B1 * | 7/2001 | Yonezawa et al. | | 348/159 |
| 6,288,740 B1 * | 9/2001 | Lai et al. | | 348/14.09 |
| 6,593,956 B1 * | 7/2003 | Potts et al. | | 348/14.09 |
| 6,624,841 B1 | 9/2003 | Buchner et al. | | |
| 6,710,797 B1 | 3/2004 | McNelley et al. | | 348/14.16 |
| 6,774,927 B1 | 8/2004 | Cohen et al. | | 348/14.1 |
| 6,795,108 B2 | 9/2004 | Jarboe et al. | | 348/14.09 |
| 6,882,358 B1 | 4/2005 | Schuster et al. | | 348/14.16 |
| 6,922,718 B2 | 7/2005 | Chang | | 709/204 |
| 6,989,836 B2 | 1/2006 | Ramsey | | 345/522 |
| 7,043,528 B2 | 5/2006 | Schmitt et al. | | 709/204 |
| 7,057,636 B1 | 6/2006 | Cohen-Solal et al. | | 348/14.08 |
| 7,111,045 B2 * | 9/2006 | Kato et al. | | 709/205 |
| 7,477,282 B2 * | 1/2009 | Firestone et al. | | 348/14.09 |
| 7,612,793 B2 | 11/2009 | Potekhin et al. | | |
| 2002/0199181 A1 | 12/2002 | Allen | | |
| 2003/0149724 A1 | 8/2003 | Chang | | 709/204 |
| 2003/0160861 A1 | 8/2003 | Barlow et al. | | 348/14.01 |

(Continued)

FOREIGN PATENT DOCUMENTS

CN        1257631 A1      6/2000    ............... H04N 7/15

OTHER PUBLICATIONS

Weinstein et al., "Emerging Technologies for Teleconferencing and Telepresence," Wainhouse Research, 54 pages, 2005.

(Continued)

Primary Examiner — Maria El-Zoobi
(74) Attorney, Agent, or Firm — Baker Botts L.L.P.

(57) ABSTRACT

A system and method for displaying participants in a videoconference between locations includes receiving a plurality of video signals from at least two cameras located at one or more remote sites. A display position is assigned for each video signal. The video signals are displayed on one or more displays. The display positions for the video signals maintain a fixed display position relative to each other video signal on the displays during the videoconference, and a number of displays is less than a number of cameras at the remote sites.

22 Claims, 4 Drawing Sheets

(56) References Cited

U.S. PATENT DOCUMENTS

| | | | | |
|---|---|---|---|---|
| 2004/0091232 | A1 | 5/2004 | Appling, III | 386/46 |
| 2005/0024484 | A1 | 2/2005 | Leonard et al. | 348/14.01 |
| 2005/0052528 | A1* | 3/2005 | Ohkawa et al. | 348/14.08 |
| 2005/0248652 | A1 | 11/2005 | Firestone et al. | 348/14.09 |
| 2005/0264648 | A1 | 12/2005 | Ivashin et al. | |
| 2006/0066717 | A1 | 3/2006 | Miceli | 348/14.09 |
| 2006/0152575 | A1 | 7/2006 | Amiel et al. | 348/14.01 |
| 2006/0158509 | A1 | 7/2006 | Kenoyer et al. | 348/14.08 |
| 2006/0168302 | A1 | 7/2006 | Boskovic et al. | 709/231 |
| 2008/0136896 | A1 | 6/2008 | Graham et al. | 348/14.08 |
| 2008/0239062 | A1* | 10/2008 | Civanlar et al. | 348/14.09 |

OTHER PUBLICATIONS

Notification of Transmittal of the International Search Report and the Written Opinion of the International Searching Authority, or the Declaration, Intl. Application No. PCT/US06/45895, 8 pages, Sep. 25, 2007.

State Intellectual Property Office of the People's Republic of China, The First Office Action, 12 pages, Mar. 1, 2010.

Lambert, *Polycom Video Communications*, ©2004 Polycom, Inc., 4 pages, Jun. 20, 2004.

Philip R. Graham et al., U.S. Appl. No. 11/567,674, USPTO Non-final Office Action dated Sep. 9, 2010.

Davis, *Video Communications Industry Backgrounder*, Wainhouse Research, www.tandberg.net, Jan. 2006.

ITU-T, H.239 (Sep. 2005), Series H: Audiovisual and Multimedia Systems, Infrastructure of audiovisual services—Systems aspects, Role Management and additional media channels for H.300-series terminals, Sep. 2005.

U.S. Patent and Trademark Office Official Action in U.S. Appl. No. 11/567,674, dated Mar. 23, 2011, 12 pages.

Communication from the European Patent Office with Extended European Search Report in European Patent Application No. 06838714.1-1241, dated Jun. 18, 2012, 7 pages.

Hein Bles et al., "A Collaborative Environment for Users of Advanced Scientific Instruments," Proceedings of the Third International Conference on Creating, Connecting and Collaborating Through Computing (C5'05), *IEEE*, 2005, 8 pages.

The Third Office Action in Chinese Patent Application No. 200680053667.1 dated Sep. 7, 2011, 7 pages.

The Patent Office of the People's Republic of China Official Action in Application No. 200680053667.1, dated Mar. 23, 2011 with translation, 13 pages.

European Patent Office, Communication Pursuant to Article 94(3) EPC for Patent Application No. 06 838 714.1-1905 dated Aug. 5, 2013, 5 pages.

\* cited by examiner

SYSTEM AND METHOD FOR DISPLAYING PARTICIPANTS IN A VIDEOCONFERENCE BETWEEN LOCATIONS

TECHNICAL FIELD

This invention relates generally to the field of telecommunications and more specifically to a system and method for displaying participants in a videoconference between locations.

BACKGROUND

There are many methods available for groups of individuals to engage in conferencing. One common method, videoconferencing, involves one or more individuals located in one location engaging in a video conference with one or more individuals located in at least one other location, remote from the first. Videoconferencing involves the use of video equipment, such as cameras and displays. When the remote location has more cameras than the local location has displays, individuals at the local location have an artificial and unrealistic experience during the videoconference. Similarly, individuals at the local location have a diminished experience if the aggregate number of cameras at several remote locations outnumbers the displays at the local location.

SUMMARY OF THE DISCLOSURE

In accordance with the present invention, disadvantages and problems associated with previous techniques for displaying participants in a videoconference between locations may be reduced or eliminated.

According to one embodiment of the present invention, a system and method for displaying participants in a videoconference between locations includes receiving a plurality of video signals from at least two cameras located at one or more remote sites. A display position is assigned for each video signal. The video signals are displayed on one or more displays. The display positions for the video signals maintain a fixed display position relative to each other video signal on the displays during the videoconference, and a number of displays is less than a number of cameras at the remote sites.

Certain embodiments of the invention may provide one or more technical advantages. A technical advantage of one embodiment includes providing a realistic experience to participants of a videoconference. In a videoconference environment in which participants at a local site view participants at a remote site, providing a realistic experience is desirable. The realistic experience may include providing a life-size image of a participant at a remote site or simulating a conference table that the participants surround. The display mimics an actual conference table where remote participants appear as if they are across the table from the local participants. Another technical advantage of another embodiment includes providing a realistic, natural experience to local participants even though the local site has fewer resources than the remote site(s). Even if a local site has fewer displays to display the video signals, the local sites' experience is not compromised. Instead, the quality of the sites' experience is maintained.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
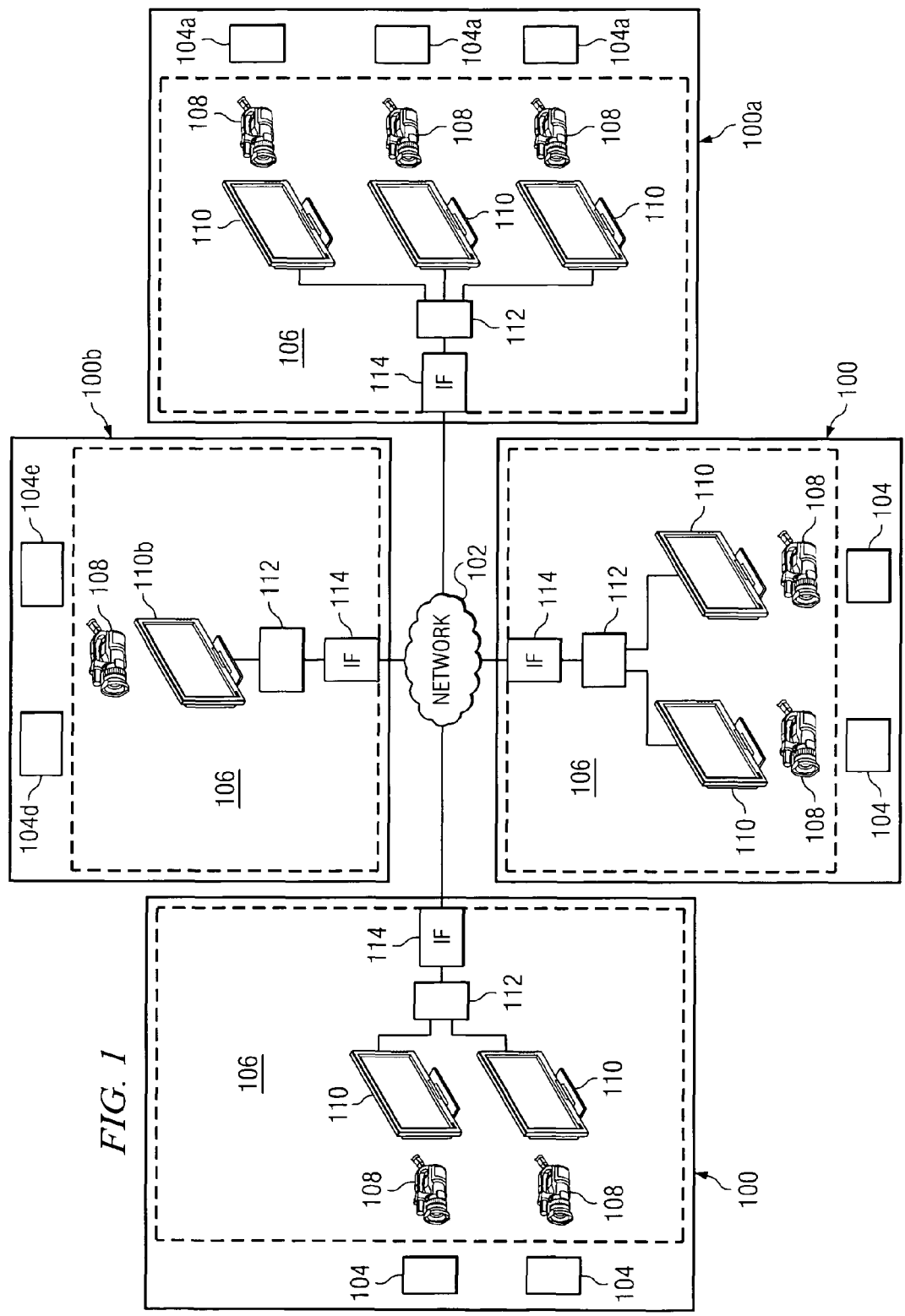
FIG. 1 is a block diagram illustrating a system for videoconferencing between sites.

FIG. 1 is a block diagram illustrating a system 10 for videoconferencing between locations. The illustrated embodiment includes a network 102 that facilitates a videoconference between remotely located sites 100 using videoconferencing equipment 106. Sites 100 include any suitable number of participants 104 that participate in the videoconference. System 10 provides participants 104 with a realistic videoconferencing experience even though a local site 100 may have less videoconferencing equipment 106 than remote site 100.

Network 102 represents communication equipment, including hardware and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication link, or any combination of the preceding. Network 102 may include any combination of gateways, routers, hubs, switches, access points, base stations, and any other hardware, software, or a combination of the preceding that may implement any suitable protocol or communication.

Participant 104 represents one or more individuals or groups of individuals who are present for the videoconference. Participants 104 participate in the videoconference using any suitable device and/or component, such as an audio Internet Protocol (IP) phones, video phone appliances, personal computer (PC) based video phones, and streaming clients. During the videoconference, participants 104 engage in the session as speakers or participate as non-speakers.

Videoconferencing equipment 106 facilitates the videoconferencing among participants 104. Videoconferencing equipment 106 may include any suitable elements to establish and facilitate the videoconference. For example, videoconferencing equipment 106 includes speakers, microphones, or a speakerphone. In the illustrated embodiment, videoconferencing equipment 106 includes cameras 108, displays 110, a processor 112, and a network interface 114.

Cameras 108 include any suitable hardware and/or software to facilitate capturing an image of participant 104 and providing the image to other participants 104. Cameras 108 capture and transmit the image of participant 104 as a video signal. Displays 110 include any suitable hardware and/or software to facilitate receiving the video signal and displaying the image of participant 104 to other participants 104. For example, displays 110 may include a notebook PC or a wall mounted display. Displays 110 display the image of participant 104 using any suitable technology that provides a realistic image, such as high definition, high-power compression hardware, and efficient encoding/decoding standards. Videoconferencing equipment 106 establishes the videoconference session using any suitable technology and/or protocol, such as Session Initiation Protocol (SIP) or H.323. Additionally, videoconferencing equipment 106 may support and be interoperable with other video systems supporting other standards, such as H.261, H.263, and/or H.264.

Processor 112 controls the operation and administration of videoconferencing equipment 106 by processing information and signals received from cameras 108 and interface 114. Processor 112 includes any suitable hardware, software, or both that operate to control and process signals. For example, processor 112 may be a programmable logic device, a microcontroller, a microprocessor, any suitable processing device, or any combination of the preceding. Interface 114 communicates information and signals to and receives information and signals from network 102. Interface 114 represents any port or connection, real or virtual, including any suitable hardware and/or software that allow videoconferencing equipment 106 to exchange information and signals with network 102, other videoconferencing equipment 106, or and/or other elements of system 10.

In an example embodiment of operation, participants 104 at sites 100a and 100b participate in a videoconference. When participants 104 join the videoconference, a video signal is generated that gets assigned a display position. The display position represents a position of participant 104 at a virtual conference table. Each video signal maintains its display position throughout the videoconference. The display position may be assigned to participants 104 in any suitable manner. For example, the display positions may be assigned based on the order in which participants 104 enter the conference. In this example embodiment, participant 104a is assigned the first display position, participant 104b receives the second display position, participant 104c receives the third display position, participant 104d receives the fourth display position, and participant 104e receives the fifth display position. If additional participants 104 join the conference, the assignment of display positions continues similarly.

As various participants 104 speak during the videoconference, the video signal of the speaker is displayed according to the assigned display position. The displays are updated according to which participant 104 is speaking. For example, when participant 104a at site 100a speaks during the videoconference, camera 108a captures an image of participant 104a and provides the image as a video signal to site 100b. The video signal is displayed at site 100b on display 110b based on the assigned display position. If participant 104b begins to speak, display 110b displays participant 104b as the speaker. Participants 104 maintain their assigned display position and maintain their assigned display position relative to other display positions during the entire videoconference as speakers change and as displays 110 reflect that change. Therefore, an impression is given that participant 104 at local site 100 is looking at a particular segment of a conference table. As different participants 104 speak during the conference, participant 104 at local site 100 looks at a different segment of the virtual conference table. The audio signal of the speaker accompanies the speaker's video signal as changes occur during the videoconference.

Modifications, additions, or omissions may be made to system 10. For example, system 10 may include any suitable number of sites 100 and may facilitate a videoconference between any suitable number of sites 100. As another example, sites 100 may include any suitable number of cameras 108 and displays 110 to facilitate a videoconference. As yet another example, the videoconference between sites 100 may be point-to-point conferences or multipoint conferences. For point-to-point conferences, the number of displays 110 at local site 100 is less than the number of cameras 108 at remote site 100. For multipoint conferences, the aggregate number of cameras 108 at remote sites 100 is greater than the number of displays 110 at local site 100. Moreover, the operations of system 10 may be performed by more, fewer, or other components. Additionally, operations of system 10 may be performed using any suitable logic.

Figure 2:
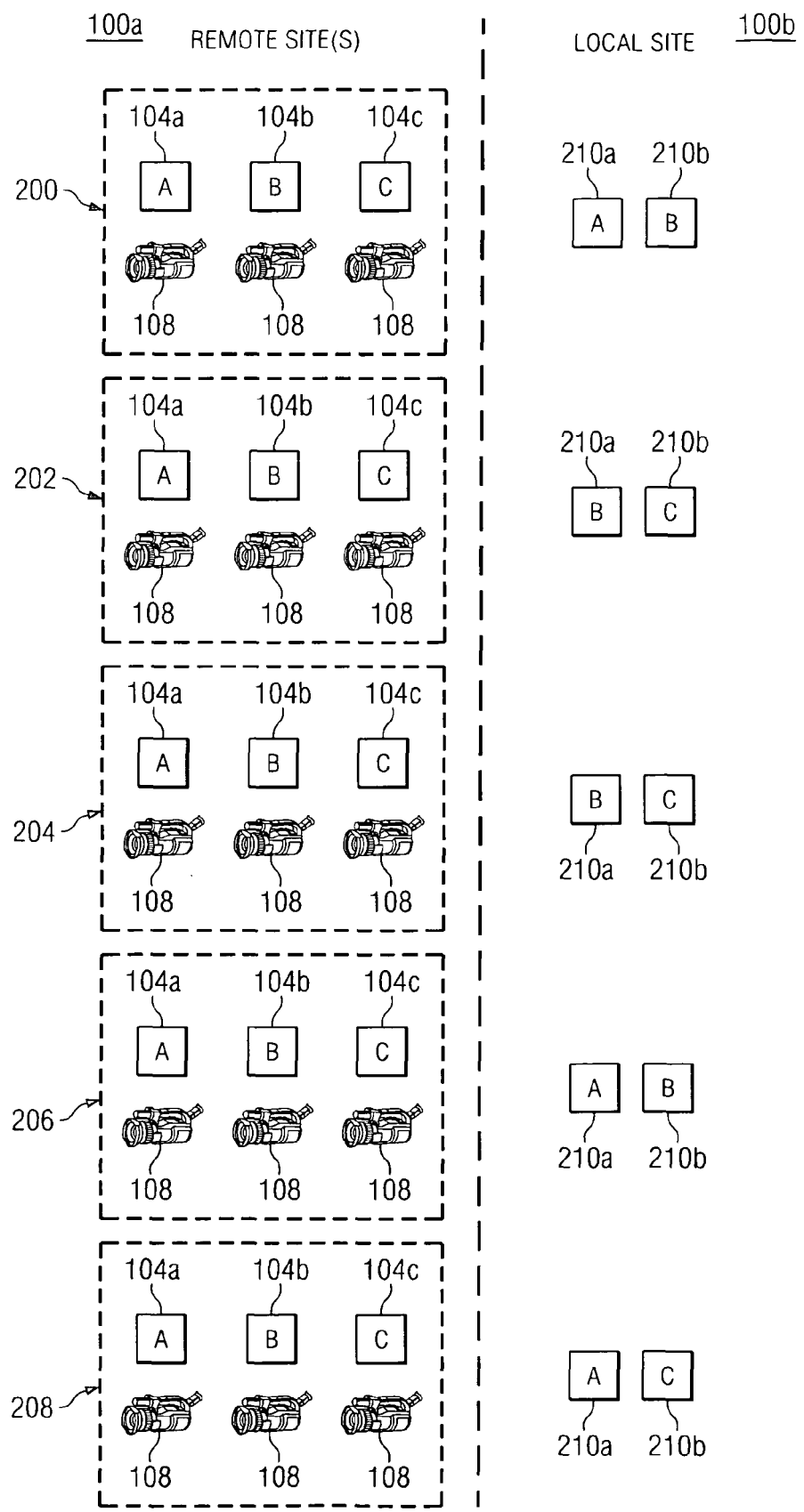
FIG. 2 is a diagram illustrating an embodiment of displaying participants of a videoconference at a local site.

FIG. 2 is a diagram illustrating an embodiment of displaying participants 104 of a videoconference at a local site 100b. At remote site 100a, cameras 108 capture images of participants 104 as video signals and communicate the video signals of participants 104 to local site 100b. The video signals are displayed at local site 100b on sections 210 of display 110. Section 210 represents display 110 or a portion of display 110. If display 110 includes multiple sections 210, display 110 may include any suitable number of sections 210.

As described above, each participant 104 is assigned a display position. The video signals of participants 104 are displayed on sections 210 according to the assigned display positions. For example, the display position of participant 104a is adjacent to the display position of participant 104b. The display position of participant 104b is adjacent to the display position of participant 104c. The assigned display positions are maintained throughout the duration of the videoconference, and the relative position of each video signal is maintained with respect to other video signals.

At 200, participant 104a is the speaker, and the video signals of participants 104a and 104b are displayed on sections 210a and 210b, respectively, at local site 100b. The video signals of participants 104a and 104b are displayed to maintain their relative position to other video signals. Particularly, the exact order of participants 104 display positions is displayed. Participant 104c becomes the speaker at 202 and sections 210a and 210b change. System 10 determines that the video signal of participant 104c is not being displayed, but should be displayed. Accordingly, system 10 displays the video signal of participant 104c based on the assigned display position. The display position of participant 104c is adjacent to participant 104b. Therefore, system 10 moves the video signal of participant 104b to section 210a and displays the video signal of participant 104c in section 210b. Again, the video signals of participants 104b and 104c are displayed in the exact order of their assigned display positions.

When system 10 moves the video signal of participant 104b to section 210a and the video signal of participant 104c to section 210b, a transition effect is used to simulate movement around a conference table. This helps reinforce the idea that participant 104 is assigned a position at a virtual conference table. System 10 uses any suitable transition effect to create the illusion. For example, to change display 110, system 10 scrolls participants 104 off one side and scrolls other participants 104 on from the opposite side. As another example, system 10 fades out current participants 104 and fades in current participants. As yet another example, system 10 shrinks the video signals of current participants 104 to one side of display 110 and grows the video signals of other participants 104 from another side.

At 204, participant 104b becomes the speaker. Because section 210a already displays the video signal of participant 104b, sections 210a and 210b do not change and continue to display the video signals of participants 104b and 104c. Participant 104a becomes the speaker at 206. System 10 determines that the video signal of participant 104a is not being displayed. System 10 displays the video signal of participant 104a according to the assigned display position. The display position of participant 104a is adjacent to participant 104b. Therefore, system 10 moves the video signal of participant 104b to section 210b and displays the video signal of participant 104a in section 210a.

At 208, participant 104c becomes the speaker. In an embodiment, system 10 displays the video signals according to the relative display position with respect to other display positions but not in their exact display position. Therefore, system 10 does not change each section 210a and 210b, but changes section 210b to display the current speaker. This embodiment eliminates the possibility of continually changing sections 210 if there are dominant participants 104 that are not co-located or do not have adjacent display positions. At local site 100b, system 10 displays the video signal of participant 104a at section 210a and displays the video signal of participant 104c at section 210b. The video signals of participants 104a and 104c have display positions adjacent to the video signal of participant 104b on opposite sides. In this embodiment, system 10 displays the video signals of participants 104a and 104c according to their display position without displaying the video signals in their exact display position. Therefore, the video signal of participant 104b is not displayed, but the display position of each video signal is maintained with respect to the other video signals.

Modifications, additions, or omissions may be made while displaying video signals at local site 100b. For example, the video signals may be displayed in their exact assigned display position, or the video signals may be displayed in their assigned display position relative to other display positions. The display does not need to exactly mimic the order of the display positions. As another example, system 10 may use any suitable transition effect or combination of transition effects to change the video signals on display 110.

Figure 3:
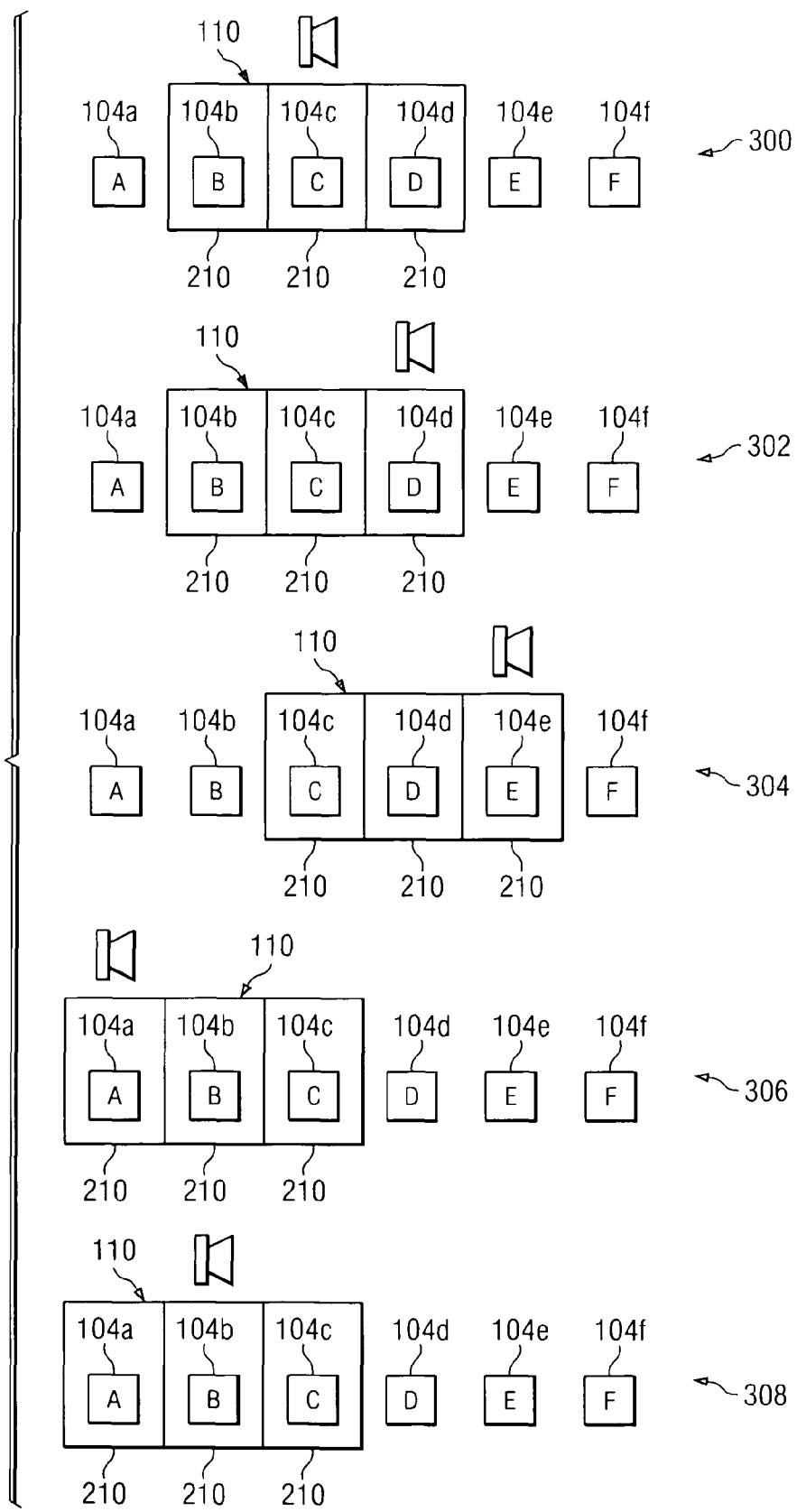
FIG. 3 is a diagram illustrating another embodiment of displaying participants of a video conference at a local site.

FIG. 3 is a diagram illustrating another embodiment of displaying participants 104 of a video conference at a local site 100. In the illustrated embodiment, display 110 includes three sections 210 to display video signals. The video signals of participants 104 move from and into sections 210 to provide for displaying the current speaker and maintaining the assigned display position related to each other video signal.

At 300, participant 104c is the speaker and the video signal has an assigned display position adjacent to participants 104b and 104d. Because display 110 has three sections 210, display 110 displays participants 104b, 104c, and 104d in sections 210. Display 110 displays participants 104b and 104d in addition to the speaker because participants 104b and 104d have an assigned position adjacent to the speaker and display 110 can accommodate their video signals.

At 302, participant 104d becomes the speaker. The video signal of participant 104d is already displayed on display 110, therefore video signals do not transition out of or into display 110. Participant 104e becomes the speaker at 304. Because the video signal of participant 104e is not displayed on display 110 at 302, video signals must be moved out of and into display 110. In the illustrated embodiment, display 110 shifts to include the video signal of participant 104e in addition to participants 104c and 104d. Because of the transition and the fixed number of sections 210, the video signal of participant 104b moves out of display 110.

Participant 104a begins to speak at 306. The video signal of participant 104a is currently not displayed on display 110. Therefore, the current video signals of participants 104c, 104d, and 104e move from sections 210 to accommodate the current speaker and to maintain the assigned display positions. The transition causes display 110 to display the video signals of participants 104a, 104b, and 104c.

At 308, participant 104b begins to speak. Because display 110 already displays the video signal of participant 104b, display 110 continues to display the same video signals as displayed in 306.

Modifications, additions, or omissions may be made to display the video signals as illustrated in FIG. 3. For example, display 110 may contain fewer sections 210, which causes the transitions to occur differently.

Figure 4:
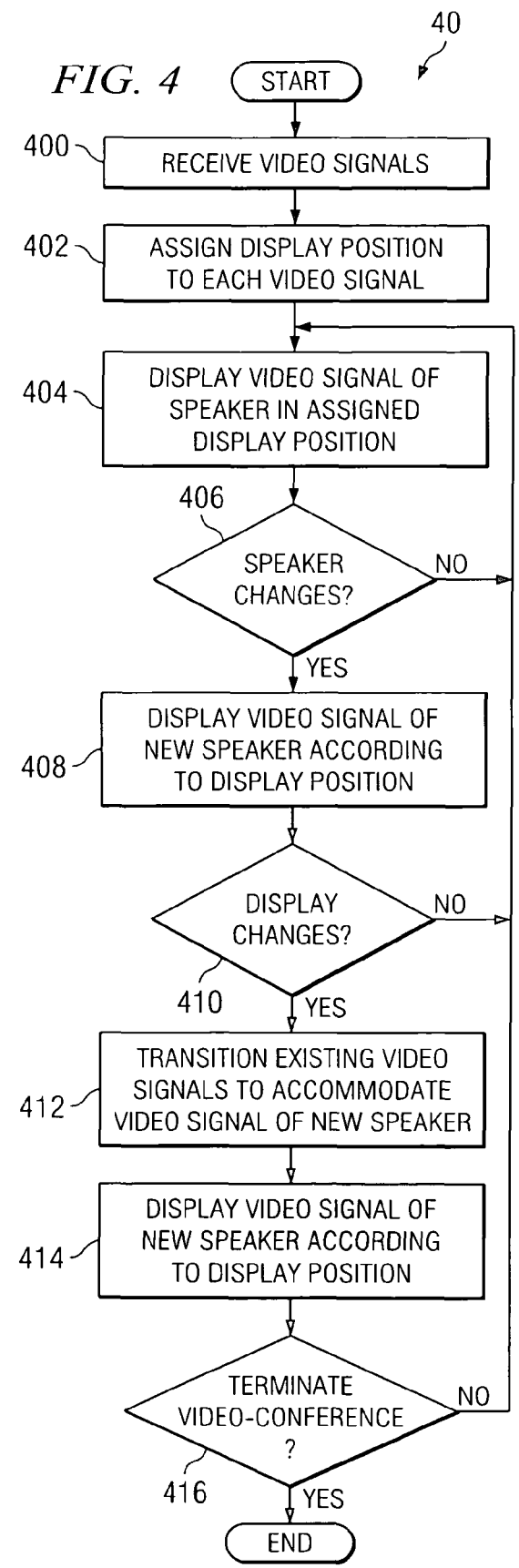
FIG. 4 is a flowchart for displaying participants of the videoconference at the local site.

FIG. 4 is a flowchart for displaying participants 104 of the videoconference at local site 100. Site 100 receives video signals at step 400. At step 402, videoconferencing equipment 106 assigns a display position to each video signal. During the videoconference, various participants 104 speak. While participant 104 is speaking, videoconferencing equipment 106 displays the video signal of the speaker in the assigned display position at step 404. At step 406, it is determined whether the speaker changes. If the speaker does not change, videoconferencing equipment 106 continues to display the same speaker at step 404. If the speaker does change, videoconferencing equipment 106 displays the video signal of the new speaker according to its assigned display position at step 408.

At step 410, videoconferencing equipment 106 determines whether display 110 changes. If display 110 remains the same, display 110 continues to display the video signal of the current speaker at step 404. If display 110 changes, videoconferencing equipment 106 transitions the existing video signals to accommodate the video signal of the new speaker at step 412. The transition includes a transition effect to maintain an environment that simulates a conference occurring around a conference table. Upon transitioning the video signals, videoconferencing equipment 106 displays the video signal of the new speaker according to the display position at step 414. At step 416, it is determined if the videoconference terminates. If the videoconference does not terminate, videoconferencing equipment 106 continues displaying the current speaker at step 404. If the videoconference terminates at step 412, videoconferencing equipment 106 discontinues displaying video signals and the method ends.

Modifications, additions, or omissions may be made to flowchart 40. Flowchart 40 may include more, fewer, or other steps. For example, videoconferencing equipment 106 may use any suitable transition effect to change the display of video signals during the videoconference. Flowchart 40 may include more, fewer, or other steps. Additionally, steps may be performed in any suitable order and by any suitable component.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for displaying a videoconference, comprising:
    receiving, at a local site, a plurality of video signals from at least two cameras located at one or more remote sites;
    assigning each video signal to a respective display position associated with a plurality of displays at the local site for a duration of the videoconference, wherein the display position for each video signal represents a position of a participant at a virtual conference table, wherein the display position for each video signal maintains a fixed display position at the virtual conference table relative to the display position of each other video signal at the virtual conference table during the videoconference;

displaying the video signals on one or more displays, wherein a number of displays at the local site is less than an aggregate number of cameras at the one or more remote sites and a number of video signals displayed is less than a number of video signals received, the video signals displayed on the one or more displays chosen based on a current speaker and the position of the speaker at the virtual conference table;

determining that a speaker change occurs in one or more of the plurality of video signals;

automatically adjusting display of the video signals on the one or more displays to accommodate a video signal associated with the speaker change such that the assigned display position of each video signal included on the one or more displays is maintained at the respective position of the participant at the virtual conference table.

2. The method of claim 1, wherein the one or more displays comprise at least two sections and displaying the video signals on one or more displays comprises:

displaying a first video signal in a first section according to the display position of the first video signal; and displaying a second video signal in a second section according to the display position of the second video signal, wherein the display position of the second video signal is maintained relative to the display position assigned to each other video signal.

3. The method of claim 1, wherein the one or more displays comprises at least two sections and displaying the video signals on one or more displays comprises:

displaying a first video signal in a first section according to the display position of the first video signal;

displaying a second video signal in a second section according to the display position of the second video signal, wherein the second section is adjacent to the first section;

determining a third video signal to display;

displaying the third video signal in the second section according to the display position of the third video signal; and moving the second video signal from the second section to the first section to maintain the display position of the second video signal relative to the display position assigned to each other video signal.

4. The method of claim 3, wherein displaying the third video signal in the second section and moving the second video signal from the second section to the first section comprises transitioning the video signals in the first and second sections using a transition effect.

5. The method of claim 1, wherein the one or more displays comprise at least two sections and displaying the video signals on one or more displays comprises:

displaying a first video signal of a speaker in a first section according to the display position of the first video signal; and displaying a second video signal of a non-speaker in a second section according to the display position of the second video signal, wherein the display position of the second video signal is maintained relative to the display position assigned to each other video signal.

6. The method of claim 1, wherein the one or more displays comprises at least two sections and displaying the video signals on one or more displays comprises:

displaying a first video signal of a first speaker in a first section according to the display position of the first video signal;

displaying a second video signal of a non-speaker in a second section according to the display position of the second video signal, wherein the second section is adjacent to the first section;

determining a third video signal of a second speaker to display;

displaying the third video signal in the second section according to the display position of the third video signal; and moving the second video signal from the second section to the first section to maintain the display position of the second video signal relative to the display position assigned to each other video signal.

7. The method of claim 6, wherein displaying the third video signal in the second section and moving the second video signal from the second section to the first section comprises transitioning the video signals in the first and second sections using a transition effect.

8. A non-transitory computer readable medium comprising logic for displaying a videoconference, the logic when executed operable to:

receive, at a local site, a plurality of video signals from at least two cameras located at one or more remote sites;

assign each video signal to a respective display position associated with a plurality of displays at the local site for a duration of the videoconference, wherein the display position for each video signal represents a position of a participant at a virtual conference table, wherein the display position for each video signal maintains a fixed display position at the virtual conference table relative to the display position of each other video signal on at the virtual conference table during the videoconference;

display the video signals on one or more displays, wherein a number of displays at the local site is less than an aggregate number of cameras at the one or more remote sites and a number of video signals displayed is less than a number of video signals received, the video signals displayed on the one or more displays chosen based on a current speaker and the position of the speaker at the virtual conference table;

determine that a speaker change occurs in one or more of the plurality of video signals;

automatically adjust display of the video signals on the one or more to accommodate a video signal associated with the speaker change such that the assigned display position of each video signal included on the one or more displays is maintained at the respective position of the participant at the virtual conference table.

9. The non-transitory computer readable medium of claim 8, wherein the one or more displays comprise at least two sections and displaying the video signals on one or more displays comprises:

displaying a first video signal in a first section according to the display position of the first video signal; and displaying a second video signal in a second section according to the display position of the second video signal, wherein the display position of the second video signal is maintained relative to the display position assigned to each other video signal.

10. The non-transitory computer readable medium of claim 8, wherein the one or more displays comprises at least two sections and displaying the video signals on one or more displays comprises:

displaying a first video signal in a first section according to the display position of the first video signal;

displaying a second video signal in a second section according to the display position of the second video signal, wherein the second section is adjacent to the first section;

determining a third video signal to display;

displaying the third video signal in the second section according to the display position of the third video signal; and moving the second video signal from the second section to the first section to maintain the display position of the second video signal relative to the display position assigned to each other video signal.

11. The non-transitory computer readable medium of claim 10, wherein displaying the third video signal in the second section and moving the second video signal from the second section to the first section comprises transitioning the video signals in the first and second sections using a transition effect.

12. The non-transitory computer readable medium of claim 8, wherein the one or more displays comprise at least two sections and displaying the video signals on one or more displays comprises:

displaying a first video signal of a speaker in a first section according to the display position of the first video signal; and displaying a second video signal of a non-speaker in a second section according to the display position of the second video signal, wherein the display position of the second video signal is maintained relative to the display position assigned to each other video signal.

13. The non-transitory computer readable medium of claim 8, wherein the one or more displays comprises at least two sections and displaying the video signals on one or more displays comprises:

displaying a first video signal of a first speaker in a first section according to the display position of the first video signal;

displaying a second video signal of a non-speaker in a second section according to the display position of the second video signal, wherein the second section is adjacent to the first section;

determining a third video signal of a second speaker to display;

displaying the third video signal in the second section according to the display position of the third video signal; and moving the second video signal from the second section to the first section to maintain the display position of the second video signal relative to the display position assigned to each other video signal.

14. The non-transitory computer readable medium of claim 13, wherein displaying the third video signal in the second section and moving the second video signal from the second section to the first section comprises transitioning the video signals in the first and second sections using a transition effect.

15. A system for displaying a videoconference, comprising:

a plurality of sites operable to communicate in a videoconference, wherein the videoconference occurs between a local site and one or more remote sites, each site comprising:

videoconferencing equipment comprising one or more cameras and one or more displays, the videoconferencing equipment operable to:

receive, at the local site, a plurality of video signals from at least two cameras located at the one or more remote sites; and assign each video signal to a respective display position associated with a plurality of displays at the local site for a duration of the videoconference, wherein the display position for each video signal represents a position of a participant at a virtual conference table, wherein the display position for each video signal maintains a fixed display position at the virtual conference table relative to the display position of each other video signal at the virtual conference table during the videoconference; and the one or more displays operable to:

display the video signals on the one or more displays, wherein a number of displays at the local site is less than an aggregate number of cameras at the one or more remote sites and a number of video signals displayed is less than a number of video signals received, the video signals displayed on the one or more displays chosen based on a current speaker and the position of the speaker at the virtual conference table;

determine that a speaker change occurs in one or more of the plurality of video signals; and automatically adjust display of the video signals on the one or more displays to accommodate a video signal associated with the speaker change such that the assigned display position of each video signal included on the one or more displays is maintained at the respective position of the participant at the virtual conference table.

16. The system of claim 15, wherein the one or more displays comprise at least two sections and the videoconferencing equipment is operable to:

display a first video signal in a first section according to the display position of the first video signal; and display a second video signal in a second section according to the display position of the second video signal, wherein the display position of the second video signal is maintained relative to the display position assigned to each other video signal.

17. The system of claim 15, wherein the one or more displays comprises at least two sections and videoconferencing equipment is operable to:

display a first video signal in a first section according to the display position of the first video signal;

display a second video signal in a second section according to the display position of the second video signal, wherein the second section is adjacent to the first section;

determine a third video signal to display;

display the third video signal in the second section according to the display position of the third video signal; and move the second video signal from the second section to the first section to maintain the display position of the second video signal relative to the display position assigned to each other video signal.

18. The system of claim 17, wherein the videoconferencing equipment is operable to transition the video signals in the first and second sections using a transition effect.

19. The system of claim 15, wherein the one or more displays comprise at least two sections and the videoconferencing equipment is operable to:

display a first video signal of a speaker in a first section according to the display position of the first video signal; and display a second video signal of a non-speaker in a second section according to the display position of the second video signal, wherein the display position of the second video signal is maintained relative to the display position assigned to each other video signal.

20. The system of claim 15, wherein the one or more displays comprises at least two sections and the videoconferencing equipment is operable to:
   display a first video signal of a first speaker in a first section according to the display position of the first video signal;
   display a second video signal of a non-speaker in a second section according to the display position of the second video signal, wherein the second section is adjacent to the first section;
   determine a third video signal of a second speaker to display;
   display the third video signal in the second section according to the display position of the third video signal; and
   move the second video signal from the second section to the first section to maintain the display position of the second video signal relative to the display position assigned to each other video signal.

21. The system of claim 20, wherein the videoconferencing equipment is operable to transition the video signals in the first and second sections using a transition effect.

22. A system for displaying a videoconference, comprising:
   means for receiving, at a local site, a plurality of video signals from at least two cameras located at one or more remote sites;
   means for assigning each video signal to a respective display position associated with a plurality of displays at the local site for a duration of the videoconference, wherein the display position for each video signal represents a position of a participant at a virtual conference table, wherein the display position for each video signal maintains a fixed display position at the virtual conference table relative to the display position of each other video signal at the virtual conference table during the videoconference;
   means for displaying the video signals on one or more displays, wherein a number of displays at the local site is less than an aggregate number of cameras at the one or more remote sites and a number of video signals displayed is less than a number of video signals received, the video signals displayed on the one or more displays chosen based on a current speaker and the position of the speaker at the virtual conference table;
   means for determining that a speaker change occurs in one or more of the plurality of video signals;
   means for automatically adjusting display of the video signals on the one or more displays to accommodate a video signal associated with the speaker change such that the assigned display position of each video signal included on the one or more displays is maintained at the respective position of the participant at the virtual conference table.

* * * * *